United States Patent [19]

Loughry

[11] 3,777,054

[45] Dec. 4, 1973

[54] VERTICAL SYNCHRONIZATION TIME BASE ERROR CORRECTOR

[75] Inventor: Don J. Loughry, San Jose, Calif.

[73] Assignee: Avco Corporation, San Jose, Calif.

[22] Filed: Mar. 13, 1972

[21] Appl. No.: 234,022

[52] U.S. Cl.... 178/6.6 SF, 178/6.6 FS, 178/6.6 HS, 178/6.6 TC, 178/69.5 DC, 179/100.2 T

[51] Int. Cl. ......................... H04m 1/22, H04m 5/78

[58] Field of Search .................. 178/6.6 SF, 6.6 FS, 178/6.6 HS, 6.6 TC, 69.5 DC, DIG. 3; 179/100.2 T

[56] References Cited

UNITED STATES PATENTS

| | | | |
|---|---|---|---|
| 3,662,101 | 5/1972 | Segerstrom | 178/6.6 SF |
| 3,470,315 | 9/1969 | Kihara | 179/100.2 T |
| 3,395,248 | 7/1968 | Suzuki et al. | 178/6.6 FS |
| 3,359,365 | 12/1967 | Kihara | 178/6.6 HS |
| 3,470,316 | 9/1969 | Kihara | 179/100.2 T |
| 3,573,357 | 4/1971 | Toce | 178/6.6 SF |

*Primary Examiner*—Vincent P. Canney
*Assistant Examiner*—Stuart Hecker
*Attorney*—Charles M. Hogan

[57] ABSTRACT

The invention discloses a means and method of eliminating jitter, during playback, in video reproducing and/or recording apparatus utilizing the skip field system. This jitter is eliminated and both horizontal and vertical continuity of sync assured by phase displacing head No. 2, and delaying, in a controlled manner, the vertical synchronizing signals applied to the television receiver for playback by heads Nos. 1 and 3.

3 Claims, 7 Drawing Figures

PATENTED DEC 4 1973 3,777,054

SHEET 2 OF 4

VERTICAL SYNCHRONIZATION TIME BASE ERROR CORRECTOR

BACKGROUND OF THE INVENTION

The invention is of particular utility in video reproducing and/or recording apparatus of the type which utilizes the skip field bandwidth reduction system together with a visual readout, such as a television receiver.

The prior art relating to the skip field system of bandwidth reduction is well developed. For example, it includes: German patent 1,214,719 published Apr. 21, 1966; Japanese utility model patent 841,176, dated Jan. 30, 1968; U.S. Pat. No. 3,391,248 to Hirota, issued July 2, 1968; U.S. Pat. No. 3,359,365 to Kihara, issued Dec. 19, 1967; and U.S. Pat. No. 3,573,357 to Toce, issued Apr. 6, 1971.

As is well known to those familiar with the art, standard television receiver practices in the United States of America involve the display of 60 fields per second, i.e., 30 even fields and 30 odd fields, each comprising 262-½ horizontal lines or, as expressed in the alternative, 30 frames of 525 lines.

One of the standard video recording and reproducing practices involves the recording and playback of video signals pertinent to all the fields. In accordance with the skip field practice, however, only selected fields are recorded but each field is repetitively played back. For example, making reference to FIG. 9 to the Kihara U.S. Pat. No. 3,359,365, a skip field apparatus might involve the recording of odd field No. 1, followed by even field No. 4, and then by odd field No. 7, and even field No. 10 in sequence. That is to say, even field No. 2 and odd field No. 3 are not recorded. Nor are odd field No. 5 and even field No. 6. Nor even field No. 8 and odd field No. 9. The fact that only one of each sequence of three fields is recorded permits a reduction in band width.

Again referring to FIG. 9 of the Kihara patent, the reproducing apparatus, which may include a television receiver type of readout, would reproduce odd field No. 1 three times in succession. This operation would be followed by a triplicate reproduction of even field No. 4, followed by a thrice play of odd field No. 7.

It is generally too often assumed that the video signals recorded in this reduced band width system, such as the sequence of fields Nos. 1, 4 and 7, together with associated recorded synchronizing signals, can be fed into a television receiver and that the timing of the synchronizing signals will ipso facto be correct. This assumption is invalid as will now be demonstrated.

This discussion postulates the use of three playback heads, angularly displaced on a suitable multiple transducer mount and so arranged that they are successively switched to track for helical scanning.

The horizontal and vertical deflections for the NTSC standard television signal accord with Curves A and B of FIG. 1. Note the continuity of horizontal deflection. That is to say, the horizontal sync rate is maintained constant throughout each frame. Now problems arise in maintaining continuity of horizontal synchronization when the skip field system is employed. For example, when two odd fields are played in succession there is a one-half line discontinuity in vertical synchronization as illustrated by Curves A and B of FIG. 2. This discontinuity is cured by angularly advancing or displacing head No. 2 so that the second odd field is effectively shifted forwardly by one half line. See Curves $A_2$ and $B_2$ of FIG. 3. In like manner when even fields are scanned in succession the horizontal scanning discontinuity is eliminated by reason of the displacement of head No. 2.

Now note that in FIG. 3 there would be a discontinuity in the vertical synchronization if it were similarly shifted forward by one-half of a horizontal line. However, it is necessary to maintain continuity of vertical synchronization. This cannot be accomplished by the sole step of deriving synchronization signals from a source independent of the signals recorded on the magnetic tape which is being played back. Means and methods of generating such independent vertical sync pulse signals are known to the prior art. However, the use of such independently generated signals is a step in the right direction.

A primary object of the invention is to eliminate picture jitter by appropriately timing the vertical synchronizing pulses for playback of the respective heads, as applied to the readout. This is accomplished by delaying the vertical reference pulses applied to the readout and therefor the information display for heads Nos. 1 and 3 playback. The video signals from heads Nos. 1 and 3 are not delayed.

FOr a better understanding of the invention, together with other and further objects, advantages and capabilities thereof, reference is made to the following description of the accompanying drawings.

SPECIFIC DESCRIPTION OF THE INVENTION

Figure 1:
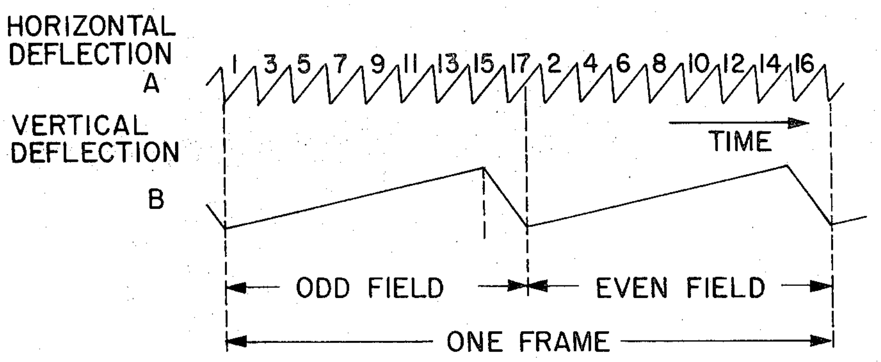
FIGS. 1, 2 and 3 are sets of curves used as aids in explaining the reasons for and operation of the invention, FIG. 1 showing the relationship between horizontal and vertical deflection for conventional NTSC signals, FIG. 2 showing a similar relationship which would exist for the skip field system of reproduction, without corrective measures, and FIG. 3 showing a discontinuity in vertical sync which would exist, absent curative measures.
Figure 2:
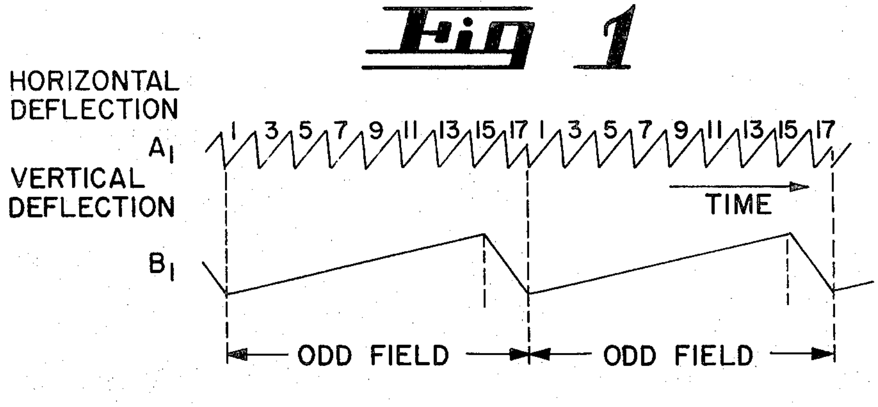
Figure 3:
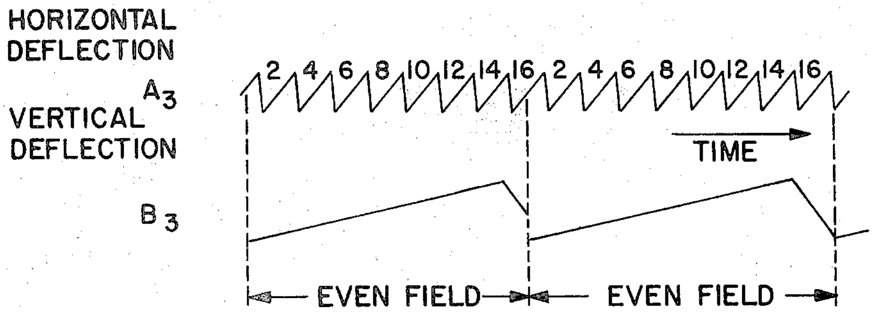

In the typical NTSC signal the start of retrace for an even field occurs at the end of a horizontal line and the leading edge of the initiating vertical sync signal is displaced from the last horizontal sync pulse by one line. However, in the case of the beginning of the odd field the corresponding displacement is only one-half line. This arrangement provides for interlace and at the same time assures continuity of horizontal sync. The television display system requires a relatively constant horizontal sync pulse rate.

In a video reproducing and/or recording system employing a television receiver readout, and in which the present invention is embodied, the signal intelligence which is applied to the readout must differ from the standard NTSC signals because the skip field system does not alternate the even and odd video fields. On the contrary, the system here improved plays back an odd field, for example field No. 1, three times, and then an even field three times, or so on. That is to say, the skip field system does not alternate fields of a distinct character. In order to provide for this, one of the three playback heads in a skip field reproducing system is angularly shifted by an amount corresponding to one-half a horizontal line. This shift satisfies the requirement for horizontal time base stability. However, in the absence of corrective measures the vertical sync signal on playback would be in error by the time of one-half a horizontal line. Application of the signal to a television display system would result in a field-to-field vertical jitter of picture information and would not exhibit interlace.

The prior art has suggested that a stable time base for vertical synchronization can be obtained from reference signals from the video tape recording scanner. However, vertical sync derived from the offset playback head is not properly positioned relative to horizontal sync and the resultant display exhibits an apparent vertical jitter of picture information. I have found that the television set will properly respond if the following conditions are satisfied: (1) The vertical reference pulse is delayed before application to the readout for playback by head No. 1. (2) The vertical sync pulse for playback by head No. 2 is the vertical reference pulse. (3) the vertical sync pulse for playback by No. 3 is the vertical reference pulse, again delayed.

That is to say, what the invention does is to modify the vertical sync signal which is used by the video display system. It has been demonstrated that vertical interlace is disappointed when time base errors occur in the vertical synchronization signals. The present invention provides electronic circuitry which introduces compensatory vertical time base errors, causing a shift in the display such that vertical interlace is achieved. This is accomplished by shifting the leading edge of the first and third vertical reference pulses in each sequence in a controlled manner. The modified vertical sync pulse used for playback of video from head No. 1 is the delayed vertical reference, the video signals not being delayed. In head No. 2 playback the video is early by the amount of the head offset. A delay is also inserted in the vertical reference pulse employed at head No. 3.

If any three sequential fields be considered, for example three odd fields, what the invention accomplishes is a shift in the starting points of the vertical sweep so that the sweep for head No. 2 is shifted exactly one-half horizontal line relative to the sweeps for heads 1 and 3. The invention assures that the time relationship of video to such initiation is the same for all three fields in any sequence. There results the display of three successive like fields in the same vertical position followed by a second three successive like fields displayed in the second vertical position displaced one horizontal line vertically from the first three like fields. This likewise results in displaying the repeated video information in its proper relative position on the display. Interlace and full vertical resolution are preserved.

The specification will now advert to the means and method by which the desired delays are achieved. Consider, for example, Curve D in FIG. 5. It shows in sequence the generated vertical reference signals pertinent, broadly speaking, to playback of heads Nos. 1, 2, 3 and 1, respectively. As indicated above, the second vertical reference pulse is used for playback of head No. 2. However, the leading edges of the first, third and fourth pulses in Curve D are delayed.

The first and third final-form vertical sync pulses for playback from heads Nos. 1 and 3, respectively, are resultants. For example, the first pulse in Curve K is applied to the readout for playback from head No. 1. It is the resultant of the addition of the first wave form on Curve D plus the first wave form on Curve H. The third pulse in Curve K is the resultant of the wave forms in Curves D and J. The first wave form on Curve H is representative of the amount of delay applied to the leading edge of the generated vertical reference pulse before application to the readout for playback of head No. 1. The wave form on Curve J is representative of the amount of the delay applied to the leading edge of the generated vertical reference pulse before application to the readout for playback of head No. 3.

In order to introduce the desired delays I first set up two sets of delayed reference wave forms as indicated by Curves G and I. The set of delayed reference wave forms G is useful in connection with playback from head No. 1. The set of delayed reference wave forms I is useful in connection with playback from head No. 3. These are called delayed reference wave forms because their bodies are behind the leading edges of the vertical reference pulses of Curve D.

As to Curve G, only the first and fourth wave forms are used. As to Curve I, only the third wave form is used. There is need for a method to enable only the first and fourth wave forms in Curve G and only the third wave form in Curve I. This means consists of two enabling wave forms as shown in Curves E and F, each providing stretched out pulses of 20 cycles frequency, the vertical reference being 60 cycles in frequency. The positive portion of the wave form on Curve E is synchronous with head No. 1 playback and enables the first of each three wave forms on Curve G, resulting in a negative wave form per Curve H. As to Curve F, the positive wave form is synchronous with head No. 3 playback and enables the third wave form on Curve I, resulting in the negative wave form on Curve J.

It will be seen, therefore, that, from Curve K, each vertical sync pulse for playback of head No. 1 is the first pulse in Curve K with its leading edge delayed from that of the first generated pulse in Curve D by the width of the first pulse on Curve H. The second pulse on Curve K is a generated reference pulse. That is, each generated vertical reference pulse as used for playback of head No. 2 is not delayed. The vertical sync pulse as used for playback of head No. 3 is the third pulse on Curve K, the leading edge being delayed by an amount equal to the width of the wave form shown in Curve J.

Figure 4:
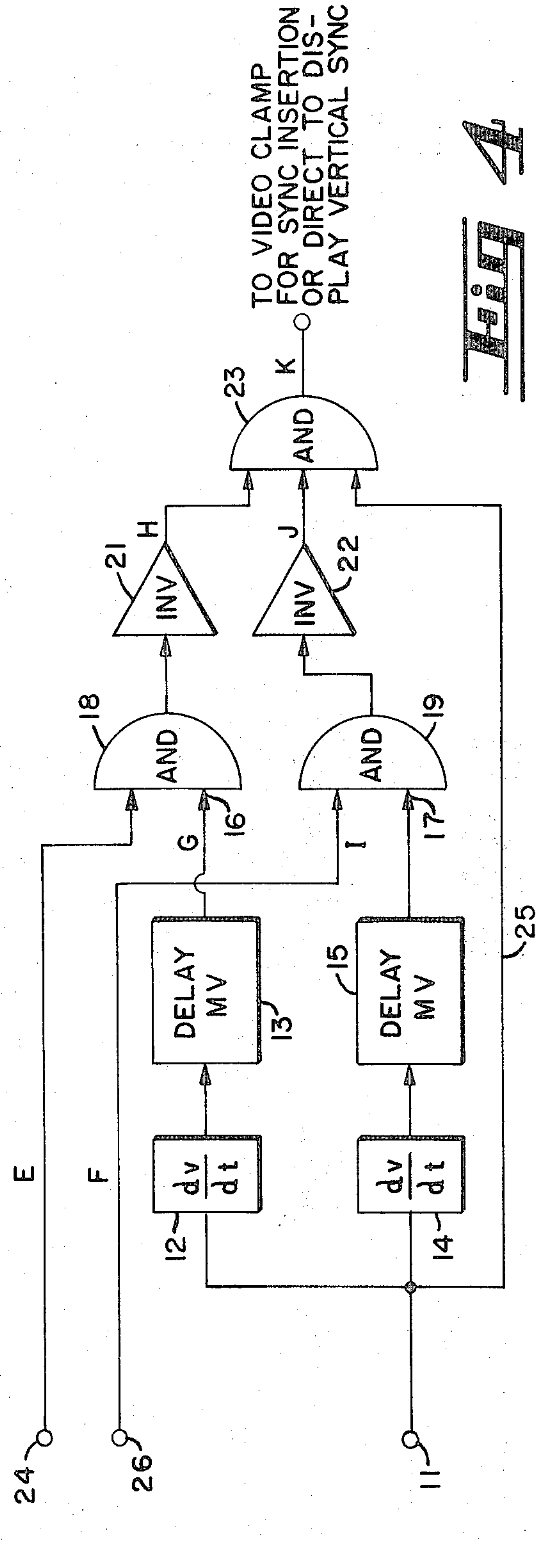
FIG. 4 is a schematic generally in block form, of a preferred form of vertical sync pulse processor in accordance with the invention.
Figure 5:
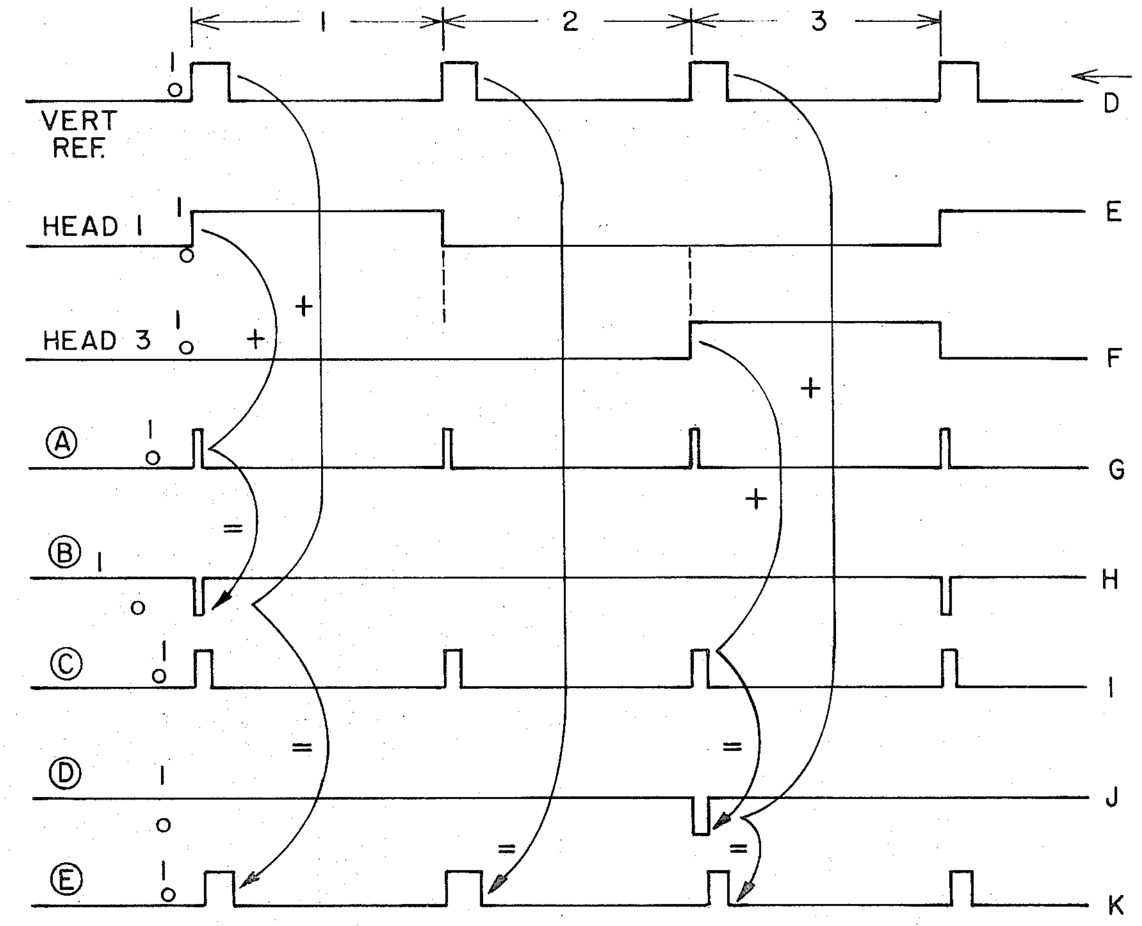
FIGS. 5 and 6 are sets of curves used in describing the operation of the FIGS. 4 and 7 embodiments respectively.

Reference is now made to FIGS. 4 and 5 for a showing of a preferred embodiment of vertical sync pulse processor in accordance with the invention. Vertical reference signals as per Curve D are applied at the input 11. Delayed reference wave forms per Curves G and I are set up by two channels, each cascaded with input 11. One channel comprises a differentiating circuit 12 and a delay multivibrator 13. The other channel comprises a differentiating circuit 14 and a delay multivibrator 15. The outputs of the delay multivibrators 13 and 15 are applied to the inputs 16 and 17 of respective AND circuits 18 and 19. The function of the multivibrators is to furnish the desired delayed wave forms, that is, the wave forms G and I.

The AND circuits 18 and 19 are respectively enabled by two 20 cycle wave forms synchronous with the vertical reference. The wave form of Curve E is positive for every activation of head No. 1. The wave form of Curve F is positive for every operation of head No. 3. It will be understood that the enabling wave forms of Curves E and F can be generated by any well-known means synchronized with the source of generated vertical reference pulses. The outputs of AND circuits 18 and 19 are respectively coupled to inverters 21 and 22. The delaying wave forms H and J appear at the outputs of these inverters and are applied to AND circuit 23.

For head No. 1 playback the first wave form on Curve D is differentiated and delayed by multivibrator 13 and the first wave form in Curve G is accordingly applied to AND circuit 18. AND circuit 18 is enabled by the positive wave form of Curve E, appearing on line 24 and accordingly there appears at the output of inverter 21 the first wave form of Curve H. The first wave form of Curve H and first vertical reference pulse, as generated, are combined in AND circuit 23 and the resultant is the first wave form in Curve K.

The second synchronizing pulse of Curves D and K passes through line 25 and appears at the output of AND circuit 23.

Consider now the playback of head No. 3. The third wave form in Curve D is differentiated by element 14 so that there appears at the output of the multivibrator 15 delayed wave forms per curve I. The positive portion of the wave form in Curve F is applied via line 26 to enable AND circuit 19 so that there appears at the output of inverter 22 the negative wave form per Curve J which, together with the third pulse in Curve D, is applied to AND circuit 23 in order to produce the third wave form shown in Curve K.

Figure 6:
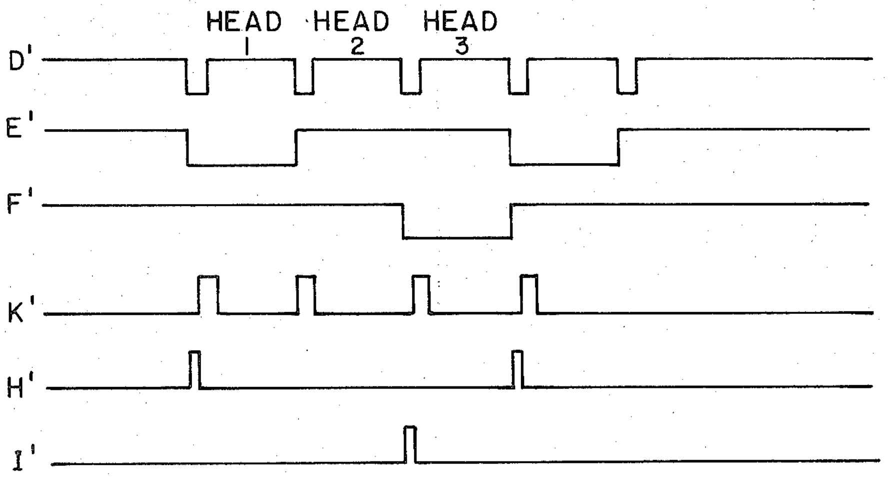
Figure 7:
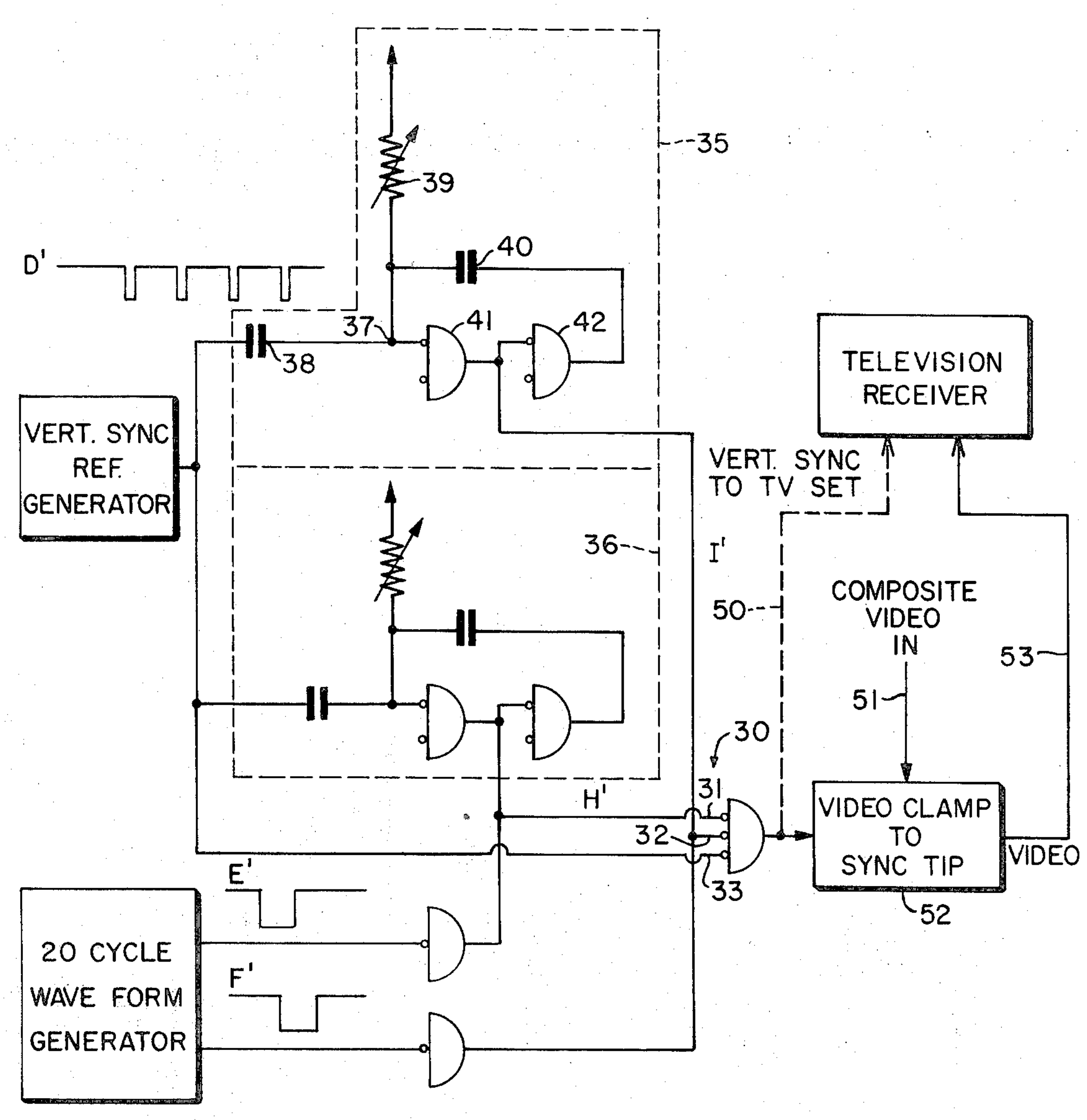
FIG. 7 is a modified form of vertical sync pulse processor in accordance with the invention.

FIGS. 6 and 7 show and explain an alternative form of vertical sync signal processor, simplified in some ways. Curves D′, E′, F′, H′, K′ and J′ illustrate its operation. The Curve D′ represents generated vertical sync pulses unprocessed. The second wave form in Curve D′ is used for playback of head No. 2. The first and third wave forms in Curve D′ pertain to playback of heads Nos. 1 and 3, respectively. This embodiment generates delay wave forms during coincidence between negative portions of the vertical reference pulses and one-third-frequency enabling wave forms. Curve D′ indicates the generated vertical sync pulses. Curves E′ and F′ are the two third-frequency enabling wave forms, of opposite polarity. When the low-going portions of the wave forms on Curves D′ and E′ are coincident there is generated a delay wave form as shown on Curve H′ (first wave form) and this delays the leading edge of the vertical sync pulse as processed and used for playback of head No. 1, the latter being the first wave form shown in Curve K′. The NAND circuit 30 passes this wave form because all of its inputs are then low. That is, as soon as the first wave form on Curve H′ has passed, all inputs to circuit 30 are low.

Now the second wave form on Curve D′ passes right through the NAND circuit 30 because all three of the inputs to that gate are then low, there being nothing effectively to prohibit the passage of this wave form.

When the low-going portions of the wave forms on Curves D′ and F′ are coincident there is generated a delay wave form as shown in Curve I′ and this delays the leading edge of the vertical sync pulse as processed and applied to head No. 3, the latter being the third wave form shown in Curve K′. The NAND circuit 30 passes this wave form because all of its inputs are then low.

One way to view the FIG. 7 embodiment is to consider that the gate 30 is not in any sense inhibited when vertical sync is generated for playback head No. 2. When vertical sync is generated for playback of head No. 1 there is a delay or effectively a timed inhibition at input 31. When vertical sync is generated for playback of head No. 3 there is a similar inhibition at input 32. The generated vertical sync pulses as shown on Curve D′ enable and, as delayed, synchronize the sweep for the first field, directly synchronize the second sweep and enable and, as delayed, synchronize the sweep for the third field. Generated vertical sync pulses are applied to gate 30 via input line 33.

As indicated, generated sync pulses, negative going, are applied to the input line 33. Units 35 and 36 are in effect differentiating and delay networks. Each comprises an input, such as 37, capacitively coupled as by 38, to line 33. A differentiating network comprising a variable resistance 39 and capacitance 40 is associated with gates 41 and 42, having an output 32 in such manner that when there is coincidence between a vertical sync pulse (Curve D′) and the supplemental one-third reference frequency wave form per E′, then gate 30 is effectively inhibited and the vertical reference pulse for playback of head No. 1 is delayed. The delay unit 36 is similar in construction and operation to the delay unit 35 and, therefore, need not be described in detail herein.

It will be understood that the delays applied to the readout for playback of heads Nos. 1 and 3 are determined visually. That is to say, the readout is viewed and the delays are adjusted until vertical jitter disappears. In the FIG. 7 embodiment, for example, delays are adjusted by variation of the resistors 30 and 33. In the FIG. 4 embodiment the width of the pulses generated by multivibrators 13 and 15 is varied.

It will be understood that the output of the vertical sync processing circuit is applied (FIG. 7), via line 50, directly to a television receiver readout or composite video is applied, via line 51, to a video clamping network 52 and the video signals are taken out at line 53 and applied to the television receiver readout as composite video.

For a showing of a prior art arrangement of transducers or heads and means for independently generating vertical synchronized reference signals, reference is made to the following United States patent applications, owned by Cartridge Television, Inc., the assignee of the present application and invention, entitled Servo System for Video Recorder and Interlacing System for Skip-Field Magnetic Recording and Reproducing, respectively, field in the U.S. Patent Office in the name of Philip M. Crosno on June 26, 1970, Ser. Nos. 50,061, now U.S. Pat. No. 3,651,955, and 50,062, now U.S. Pat. No. 3,718,755, respectively.

Having fully disclosed my invention, I claim:

1. In a video type reproducing system of the skip-two skip-field type, said system being adapted to be used with a readout and including means for providing vertical reference pulses and first, second and third transducers, said transducers being angularly substantially symmetrically displaced except for an advance of the second transducer made to maintain horizontal synchronization continuity, a circuit for processing selected ones of the vertical reference pulses applied to said readout, in order to eliminate vertical jitter during normal operation, said circuit comprising, in combination:

means adapted to apply vertical reference pulses directly to said readout for playback of the second transducer, and means for introducing a delay into the application of the first and third vertical reference pulses in any skip field sequence, so as to eliminate picture jitter.

2. In a skip-two skip-field system in which recorded video fields are played back by operating first, second and third transducers successively to scan and apply to a visual readout video intelligence and horizontal synchronizing signals from an odd field followed by video intelligence and horizontal synchronizing signals from an even field, said system including means for providing vertical reference pulses at the standard cycle rate of N, the second of said transducers being phase advanced by an amount equal to one-half horizontal line, a circuit for assuring continuity of horizontal synchronization and vertical synchronization of said readout, comprising:

means for applying the second vertical reference pulse in each corresponding series for application to the readout, means for generating a first series of pulses at N/3 rate in synchronism with the first scan in each series, and a second series of pulses at N/3 rate in synchronism with the third scan in each series, means for utilizing the first vertical reference pulse and the first N/3 rate pulse in synchronism with the first scan to develop a first field delay pulse, means for utilizing the third vertical reference pulse and the second N/3 rate pulse in synchronism with the third scan to develop a third field delay pulse, and means for utilizing the first field delay pulse and the third field delay pulse to delay the first and third vertical reference pulses in each corresponding series so as to provide delayed vertical synchronizing pulses for application to the readout.

3. A skip-two skip-field system comprising:

a television monitor readout, three transducers numbered No. 1, No. 2 and No. 3 successively operable to scan and to apply to said readout video intelligence from an odd field followed by video intelligence from an even field, the transducers being spaced generally symmetrically except that transducer No. 2 is advanced to assure continuity of horizontal synchronization, means for providing vertical reference pulses, and means for phase-displacing selected ones of the vertical reference pulses in each series to provide phase-displaced vertical synchronizing pulses for application to the readout so that the times of initiation of the three sweeps in each series are set to eliminate picture jitter.

* * * * *